(No Model.)
K. E. GUNKLE.
JAR.
No. 422,934. Patented Mar. 11, 1890.
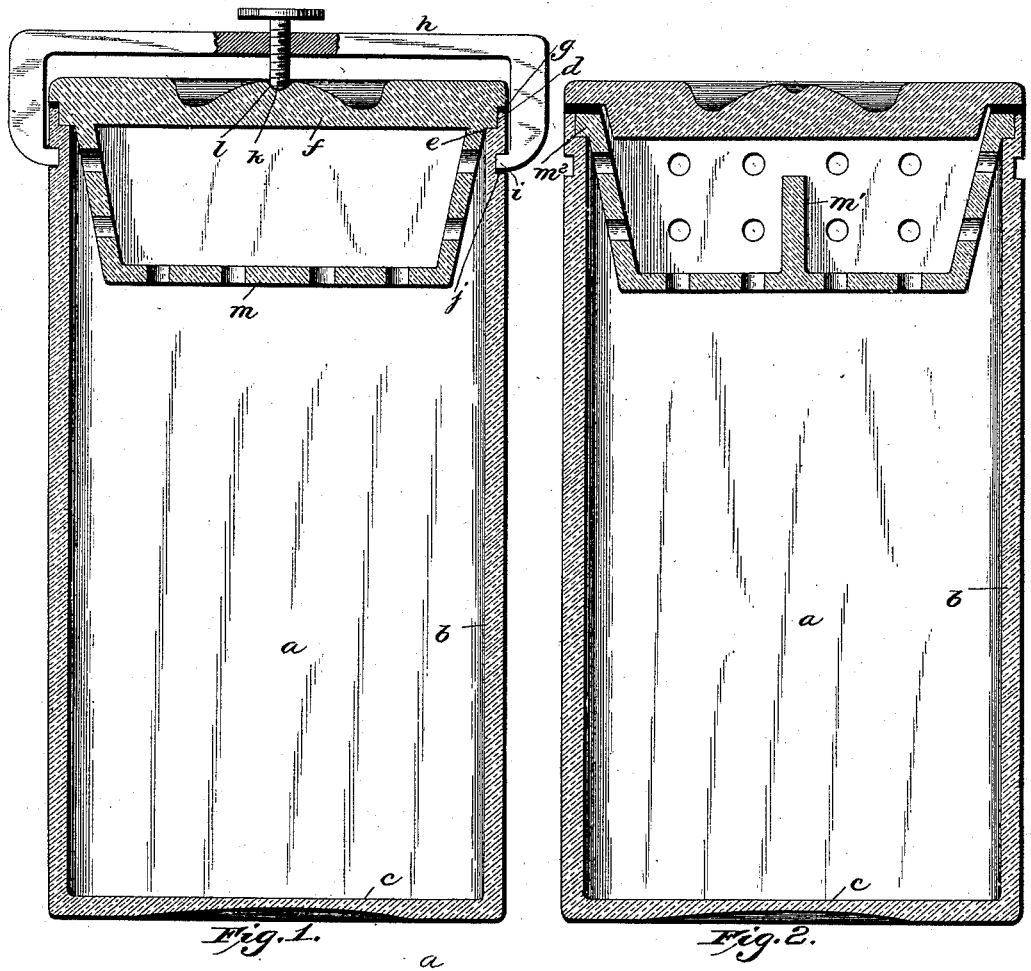
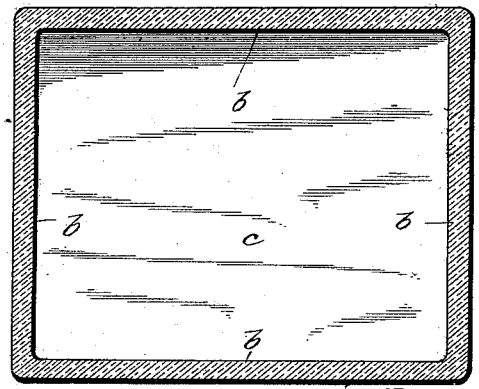
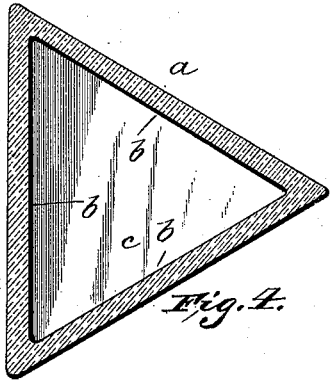
WITNESSES
F. L. Ourand
E. A. Finckel
INVENTOR
Katherine E. Gunkle
by W. H. Finckel
her Attorney

UNITED STATES PATENT OFFICE.

KATHERINE ELLMAKER GUNKLE, OF FRAZER, PENNSYLVANIA.

JAR.

SPECIFICATION forming part of Letters Patent No. 422,934, dated March 11, 1890.

Application filed January 20, 1890. Serial No. 337,485. (No model.)

*To all whom it may concern:*

Be it known that I, KATHERINE ELLMAKER GUNKLE, a citizen of the United States, residing at Frazer, in the county of Chester and State of Pennsylvania, have invented a certain new and useful Improvement in Jars, of which the following is a full, clear, and exact description.

This invention in jars relates more particularly to fruit-jars, and its special objects are to provide means for keeping the contained fruit immersed in the sirup; also, to collect and remove mold; also, to provide for the ready filling and emptying of the jar.

The invention consists in a fruit-jar having a perforated immersing device, which also serves to collect and remove mold; also, in a fruit-jar whose mouth is a continuation of the plane of the body—that is to say, the jar has no neck—all as I will proceed now more particularly to set forth and claim.

In the accompanying drawings, in the several figures of which like parts are similarly designated, Figure 1 is a vertical section showing the cover and immerser made in one piece. Fig. 2 is a similar view showing the cover and immerser made separate. Figs. 3 and 4 are horizontal sections of two forms of jar.

The body $a$ of the jar is angular in cross-section—for examples, see Figs. 3 and 4—so as to provide for packing a number of the jars without waste of space. The sides $b$ of the jar extend from the bottom $c$ straight up to the mouth $d$ without deflection and without neck, so that the jar may be filled and emptied easily and without crushing or marring the fruit. The mouth of the jar by preference is made with a shoulder $e$ to receive the cover or immerser, presently described. The cover $f$ is rabbeted to fit the mouth of the jar, and a gasket $g$ may be interposed between them. The cover may be secured to the jar in any desirable manner, but I prefer to employ a clamp $h$, having fingers $i$, which take into grooves $j$ in the sides of the jar, a screw $k$ being tapped in the clamp and abutting in a cavity $l$ in the cover to tighten the clamp upon the cover. The immerser $m$ has a perforated bottom and inclined and perforated ends, so that the liquor or sirup may enter and surround it, and this immerser may be made integral with the cover, as in Fig. 1, in which case its sides facing the observer of the drawing will be open, or the immerser may be made separate from the cover, as in Fig. 2, in which case it will have four inclined and perforated sides, a grasping-piece $m'$ for inserting and removing it, and lips $m^2$ for suspending it within the jar. The action of either form of immerser is to hold the fruit below the level of the sirup. The sirup standing in the immerser the mold will collect therein, and in removing the immerser the mold is carried with it by reason of the confining sides and may be readily washed from it.

Glass or other plastic material may be used for making my jar and immerser.

The immerser may be made and sold separately from the jar.

What I claim is—

1. A cover and an immerser, the latter having inclined perforated sides and a perforated bottom, combined with a jar having straight sides and neck within which the immerser is suspended with its inclined sides free of contact with the sides and neck of the jar, substantially as described.

2. A jar having straight sides and neck and angular in cross-section, combined with a cover and an immerser having inclined perforated sides and a perforated bottom, and angular in outline and suspended within the jar with its inclined sides free of contact with the neck and sides of the jar, substantially as described.

3. The cover $f$ and the immerser $m$, made as an integer, the latter having inclined sides and a flat bottom, and the sides and bottom being perforated, substantially as described.

In testimony whereof I have hereunto set my hand this 9th day of January, A. D. 1890.

KATHERINE ELLMAKER GUNKLE.

Witnesses:
H. G. RIESER,
J. FRANK GUNKLE.